Oct. 26, 1965 J. V. DREXLER ETAL 3,214,688

METHOD OF TESTING THIN FILMS TO DETERMINE THEIR MAGNETOSTRICTIVE CHARACTERISTICS, MATERIAL COMPOSITION AND PREFERRED AXIS OF MAGNETIZATION

Filed July 19, 1962

3 Sheets-Sheet 1

INVENTORS
JAMES V. DREXLER
DANIEL E. HUNTWORK
EUGENE F. PARROTT
BY
ATTORNEY

METHOD OF TESTING THIN FILMS TO DETERMINE THEIR MAGNETOSTRICTIVE CHARACTERISTICS, MATERIAL COMPOSITION AND PREFERRED AXIS OF MAGNETIZATION

Filed July 19, 1962 3 Sheets-Sheet 2

INVENTORS
JAMES V. DREXLER
DANIEL E. HUNTWORK
EUGENE F. PARROTT
BY [signature]
ATTORNEY METHOD OF TESTING THIN FILMS TO DETERMINE THEIR MAGNETOSTRICTIVE CHARACTERISTICS, MATERIAL COMPOSITION AND PREFERRED AXIS OF MAGNETIZATION Filed July 19, 1962 3 Sheets-Sheet 3

INVENTORS
JAMES V. DREXLER
DANIEL E. HUNTWORK
EUGENE F. PARROTT
BY [signature]
ATTORNEY United States Patent Office 3,214,688

Patented Oct. 26, 1965

3,214,688

METHOD OF TESTING THIN FILMS TO DETERMINE THEIR MAGNETOSTRICTIVE CHARACTERISTICS, MATERIAL COMPOSITION AND PREFERRED AXIS OF MAGNETIZATION

James V. Drexler and Daniel E. Huntwork, St. Paul, and Eugene F. Parrott, Coon Rapids, Minn., assignors to Sperry Rand Corporation, New York, N.Y., a corporation of Delaware Filed July 19, 1962, Ser. No. 211,018
10 Claims. (Cl. 324—34)

Figure 1:
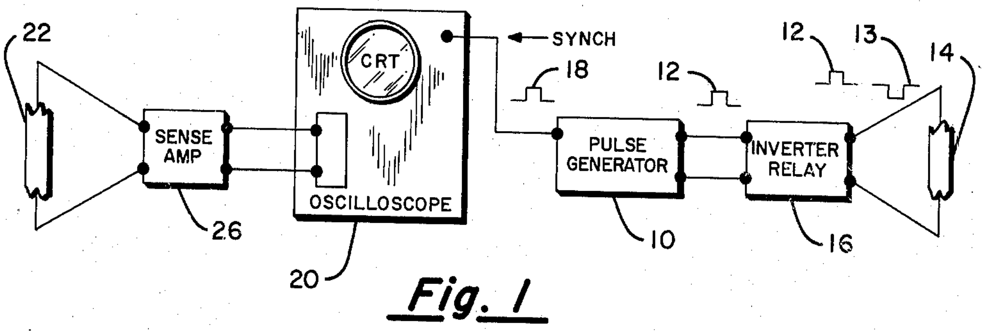

This invention relates to magnetic memory systems and more particularly to a method for the nondestructive determination of the magnetic characteristics and material composition of thin ferromagnetic films.

Magnetic memory systems of large scale data processing systems, because of the need for increasingly faster access to stored data, have dictated the need for the development of magnetic memory elements of increasingly faster switching speeds. Thin ferromagnetic films such as fabricated in accordance with Rubens Patent No. 2,900,282, and as utilized in memory systems as shown in Rubens et al. Patent No. 3,030,612, provide the necessary readout properties to provide the high speed, random access memories needed by these systems. However, due to the low magnetic fields involved and the correlated physical characteristics of thin ferromagnetic films, large quantity production facilities generally provide low percentages of useful yields.

A magnetic memory element of a thin ferromagnetic film usually consists of a Permalloy vacuum deposited spot, or bit, of approximately 50 mils in diameter and approximately 100 A. to 3000 A. (Angstroms) thick, having rectangular hysteresis characteristics and a preferred axis of magnetization. It is known that the magnetic properties of such thin ferromagnetic films are the function of many variables including the strength and angle of the orienting magnetic field during deposition, the rate of melt evaporation, and material composition. The Permalloy slug which is melted and evaporated through a mask onto the substrate as disclosed in the aforementioned Rubens Patent No. 2,900,282, as a Ni-Fe composition of approximately 83% Ni and 17% Fe. As the average material composition of the film depends on the temperature of the melt during deposition, and as the rate of evaporation increases approximately one order of magnitude for each 150° C. increase in the melt temperature during evaporation, the material composition is a sensitive function of melt temperature. Further, as the rates of evaporation for Ni and Fe do not have a corresponding variation with a change in the melt temperature, i.e., a faster rate of evaporation will cause a greater concentration of Ni to be deposited while a slower rate of evaporation will cause a greater concentration of Fe to be deposited, by determining the rate of evaporation, i.e., by varying the heat source power input, a Permalloy film possessing the desired Ni-Fe composition (in this case approximately 81% Ni, 19% Fe) can be deposited on the substrate. The pattern of the spots, or bits, on the substrate is, as before, determined by the shape of the mask. The thickness of the spots is controlled by the length of time the controlling shutter is open, and the material composition is controlled by the rate of evaporation and the material composition of the melt.

In a high production manufacturing process by which these films are produced problems arise in attempting to produce film arrays with uniform magnetic properties. Film arrays with poor uniformity are often characterized by a relatively high coercive field, $H_c$ (the longitudinal field required to switch the state of the film), large deviations in $H_c$, and/or larger than normal deviations in the preferred axis of magnetization of the films. These problems are due in part to a deviation from the desired Ni-Fe composition of the film at the time of deposition. If the deposited film becomes "iron-rich" (an excess of iron) or "nickel-rich" (an excess of nickel), a factor known as magnetostriction is introduced. Magnetostriction represents a change in geometric and magnetic properties of a film when exposed to a deforming stress. It has been found that the greater the deviation of the Ni-Fe composition from the intended composition of 81% Ni and 19% Fe the greater the factor of magnetostriction and the less desirable is the film as a storage medium.

As a film's magnetostrictive properties provide a reliable criterion to determine a film's composition, it can be appreciated that it would be desirable to establish a magnetostrictive control over the manufacturing process, or a set of limits, so that films could be checked against these limits to determine if their degree of magnestostriction were acceptable. If the majority of the films tested fell within the established limits, it would indicate that the Ni-Fe composition of the film was close to the desired norm. However, if the majority of the films tested were outside the established limits, the rate of evaporation would be changed accordingly to achieve the desired Ni-Fe composition. The subject invention has as one of its objects to provide a means of achieving a quantative figure of merit for magnetostriction in the films tested, and a corresponding indication as to whether the magnetostrictive property of the film is due to an iron-rich or nickel-rich composition.

As a general object of this invention is to provide a method of achieving high quality thin ferromagnetic films from high quantity production runs, it is to be appreciated that any quality control process that is to be utilized is to be accomplished with a minimum of equipment and a maximum of permissible operator error. The invention disclosed herein permits the reliable determination of three characteristics of a thin ferromagnetic film; preferred axis of magnetization; degree of magnetostriction expressed as a magnetostrictive figure of merit; material composition expressed as a relative preponderance of one of the two constituent elements. All three of these characteristics are determined by the same test set-up and may be performed concurrently, i.e., as parts of an overall test, or separately, i.e., as individual tests. As the determination of the magnetic characteristics and the material composition require the initial determination of the preferred axis of magnetization of the film to be tested, this determination is made first with the determination of the other two characteristics generally conducted concurrently. It will become apparent upon the reading of the detailed discussion of the methods disclosed herein that the essential determination proposed by this invention is the determination of the film's magnetic characteristics which are expressed as a numerical magnetostrictive figure of merit. Once this has been determined and compared to a predetermined acceptable range of the magnetostrictive figure of merit and it is found that the film's magnetostrictive figure of merit falls within the acceptable range, no further testing of these properties is necessary. However, if the film's magnetostrictive figure of merit falls outside of the acceptable range the determination of the film's material composition may then be made the basis of a corresponding correction of the melt temperature to achieve, on the next production run, films having a magnetostriction figure of merit which will fall within the acceptable range.

Accordingly, it is a primary object of this invention to provide a method of nondestructively testing a thin ferromagnetic film for its magnetostrictive properties.

It is a further object of this invention to provide a method of determining the magnetic properties of a thin ferromagnetic film by determining the effect of an externally applied deforming physical force upon the film.

It is a further object of this invention to provide a method of determining the material composition of a thin ferromagnetic film by determining the magnetic effect of an externally applied deforming physical force upon the film.

It is a further object of this invention to provide a method of determining a correlation between a thin ferromagnetic film's magnetostrictive properties and its magnetic properties.

It is a further object of this invention to provide a method of establishing an acceptance test of thin ferromagnetic films by the use of a quantitative figure of merit which is descriptive of the films' magnetostrictive properties.

It is a still further and more general object of this invention to provide a method of quality control of the production of thin ferromagnetic films for a high production process.

These and other more detailed and specific objects will be disclosed in the course of the following specification, reference being had to the accompanying drawings in which:

FIG. 1 is a block diagram of the magnetostrictive tester proposed by this invention.

Figure 2A:
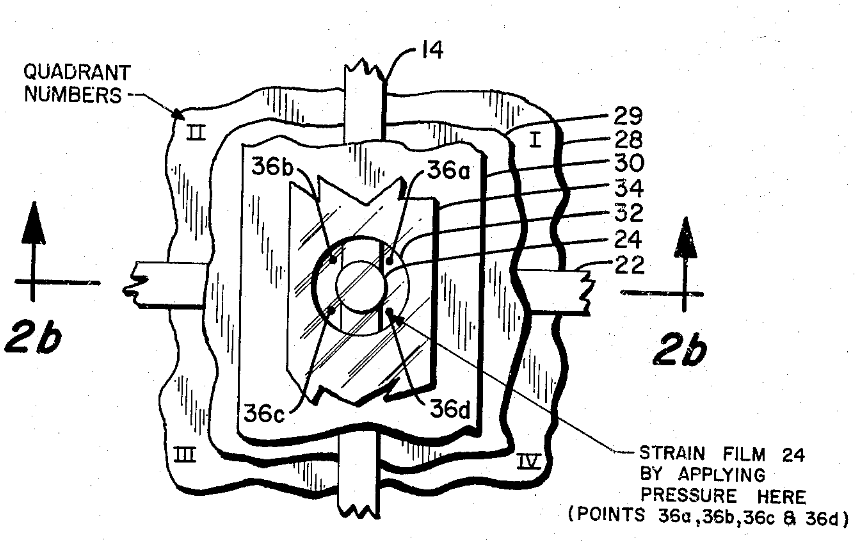

FIG. 2*a* is an illustration of a test set-up of a thin ferromagnetic film as proposed by this invention.

Figure 2B:
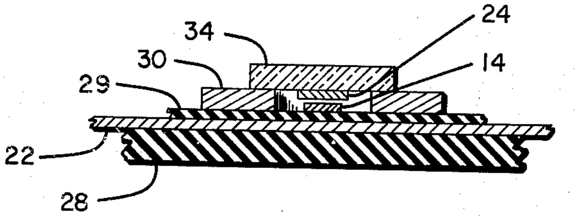

FIG. 2*b* is a cross-sectional view of the test set-up of of FIG. 2*a* taken along sense line 22.

Figure 3A:
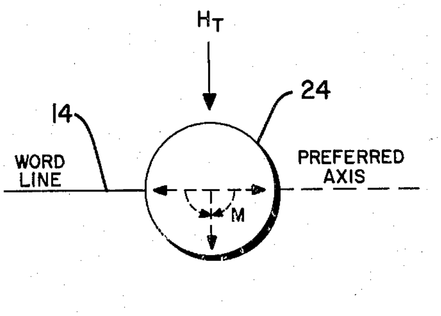

FIG. 3*a* is an illustration of the magnetic vector relationships of a thin ferromagnetic film when subjected to a 90° transverse pulsed field.

Figure 3B:
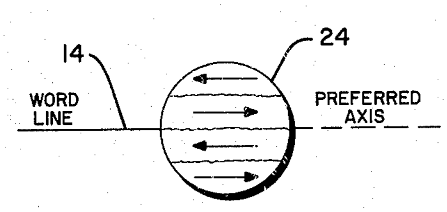

FIG. 3*b* is an illustration of the magnetic vector relationship of a thin ferromagnetic film when in a zero net magnetic state.

Figure 3C:
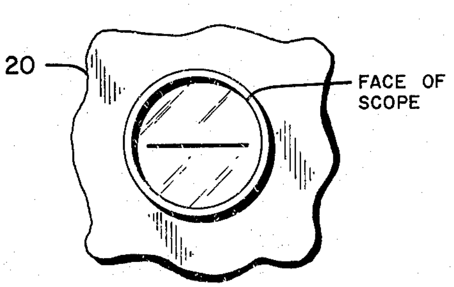

FIG. 3*c* is an oscilloscope picture of the output of the set-up of FIG. 2 when the thin ferromagnetic film is subjected to a 90° transverse pulsed field only.

Figure 4A:
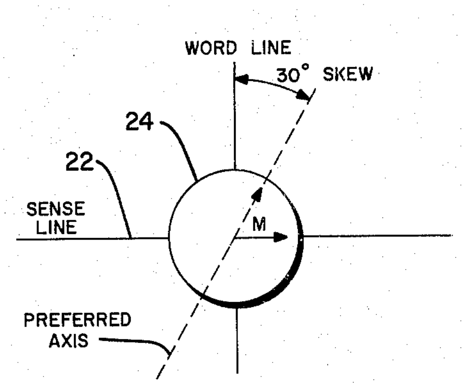

FIG. 4*a* is an illustration of the magnetic vector relationship of a thin ferromagnetic film when subjected to a 30° transverse pulsed field.

Figure 4B:
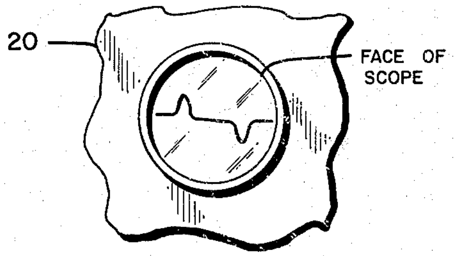

FIG. 4*b* is an oscilloscope picture of the output of the set-up of FIG. 2 when the thin ferromagnetic film is subjected to a 30° transverse pulsed field.

Figure 4C:
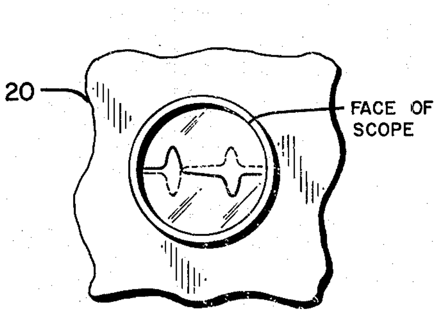

FIG. 4*c* is an oscilloscope picture of the output of the the set-up of FIG. 2 when the thin ferromagnetic film is subjected to a 30° transverse pulsed field and with the inverter relay utilized.

Figure 5A:
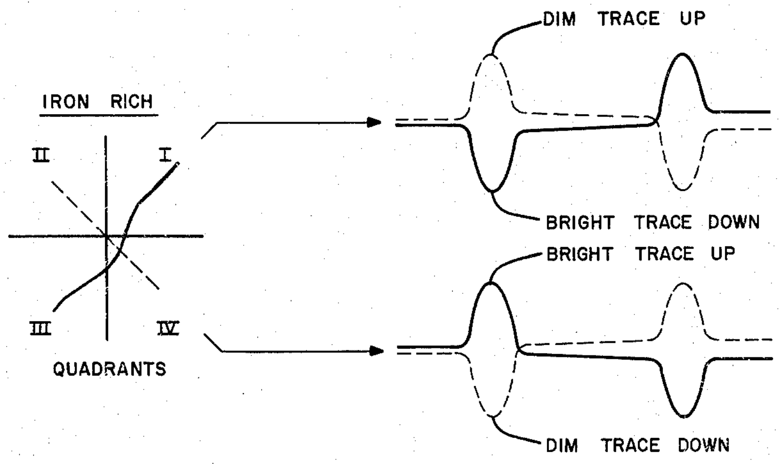

FIG. 5*a* is an illustration of the oscilloscope display obtained from the testing of an iron-rich thin ferromagnetic film in the set-up of FIG. 2.

Figure 5B:
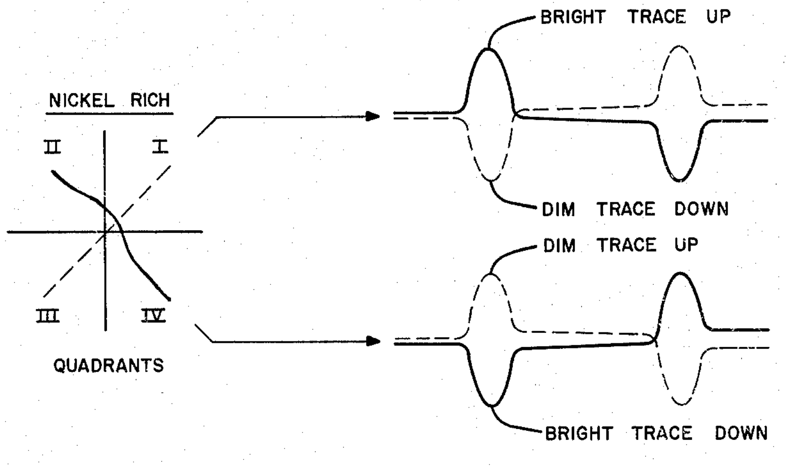

FIG. 5*b* is an illustration of the oscilloscope display obtained from the testing of a nickel-rich thin ferromagnetic film in the set-up of FIG. 2.

A block diagram of the apparatus utilized in this invention is illustrated in FIG. 1. Pulse generator 10 provides the necessary read pulse 12 to word line 14 by way of inverter relay 16 and the synchronizing pulse 18 to oscilloscope 20. Sense line 22 couples the output of thin ferromagnetic film 24 to sense amplifier 26 which provides the necessary amplification for display on oscilloscope 20. Inverter relay 16 when switched OFF permits the unaffected transmission therethrough of pulse 12 but when switched ON provides an alternating inverting function for the pulses 12 from the pulse generator 10. With inverter relay 16 ON and with pulse generator 10 generating pulses at about a 20 kilocycle rate, inverter relay 16 provides an output consisting alternately of a series of positive pulses 12 for approximately 10 ms. (milliseconds) duration and a series of negative pulses 13 for approximately 5 ms. duration. With a longer duration of the series of positive pulses 12 as compared to the shorter duration of the series of negative pulses 13 there is provided a brighter trace on oscilloscope 20 for the positive pulses 12 and a dimmer trace on oscilloscope 20 for the negative pulses 13. As will be explained subsequently in more detail, the overlay of the readout of film 24 due to the alternate application of positive and negative series of pulses is useful in the evaluation of the magnetic and material properties of film 24.

The readout of the thin ferromagnetic film 24 under test is accomplished by use of the test set-up of FIG. 2*a* wherein sense line 22 and word line 14 are both of 150 mils width and 1.3 mils in thickness copper and are supported by circuit board 28 which in the preferred embodiment is an epoxy glass sheet of 64.0 mils in thickness and are on the top surface thereof. Copper ground plane 30 of 2.7 mils in thickness with aperture 32 of approximately 150 mils diameter centered over the intersection of sense line 22 and word line 14 is situated on top of circuit board 28 and the lines 22 and 14 and minimizes interference from film cores not under test. Substrate 34 which in the preferred embodiment is a micro-drawn borosilicate glass sheet of 0.30 mils in thickness, with film 24 which in the preferred embodiment is a ferromagnetic film spot of Ni-Fe composition of 0.50 mil in diameter and 1000 A. in thickness on the underside thereof and centered upon the intersection of sense line 22 and word line 14, is situated on top of ground plane 30. Pressure points **36*a*, 36*b*, 36*c* and 36*d* are then defined by the intersections of a circle of a diameter somewhat less than that of aperture 32 centered upon the intersection of sense line 22 and word line 14 and by two lines oriented at 45° with respect to and through the intersection of sense line 22 and word line 14**.

FIG. 2*b* is presented to more clearly illustrate the particular physical relationships of the parts of FIG. 2*a* as discussed above. The positioning of film 24 in aperture 32 of ground plane 30 with inuslator 29 of a Mylar sheet of 0.05 mil in thickness providing insulation between ground plane 30 and sense line 22 and between sense line 22 and word line 14 is clearly illustrated thereby. Additionally, an insulator similar to insulator 29 is positioned between word line 14 and ground plane 30 but is omitted here for clarity.

Determination of the magnetic and material properties of film 24 by use of the test set-up of FIGS. 1 and 2*a* is initiated by the determination of the preferred axis of magnetization. This determination is based upon the ternary magnetic state of a thin ferromagnetic film having uniaxial anisotropy and as discussed in detail in the copending application of William W. Davis, Serial Number 127,092, filed July 25, 1961, and assigned to the assignee of this invention. As discussed in the above referenced copending application, application of a drive pulse 12 to word line 14 creates a magnetic drive field $\geqq H_K$ of the film under test orthogonal to word line 14 tending to orient the magnetic axis of film 24 perpendicular to word line 14. When the magnetic axis of film 24 is not parallel to word line 14, the magnetic field created by pulse 12 merely rotates the magnetization of film 24 into alignment with the field, and when after termination of pulse 12 the magnetic field collapses, the magnetization of film 24 rotates back into the preferred axis of magnetization. However, when the magnetic axis of film 24 is parallel to word line 14, the magnetic field created by pulse 12 rotates the magnetization of film 24 perpendicular to its preferred axis such that after termination of pulse 12 and the collapse of its magnetic field the magnetization of film 24 collapses in a random fashion resulting in a third magnetic stable state, usually called "demagnetized." As this collapse of the magnetization of film 24 is in a random fashion, the net induced voltage in sense line 22 is negligible resulting in a substantially zero output.

*Determination of preferred axis of magnetization*

With the above discussion in mind, the determination of the preferred axis of magnetization of film 24 is as follows:

(a) With film 24 initially oriented in a random fashion superposed the intersection of lines 22, 14, word line 14 is pulsed by pulse 12 at a frequency of approximately 20 kilocycles with the output of sense line 22 presented on the face of oscilloscope 20.

(b) Film 24 is rotated about an axis intersecting the intersection of lines 22, 14 and perpendicular to the substrate 28 plane until the output of sense line 22 decreases substantially to zero as indicated by oscilloscope 20 and as illustrated in FIG. 3*c*. This output indicates that the preferred axis of magnetization of film 24 is parallel to word line 14 as illustrated in FIG. 3*a* and that the net magnetization of film 24 is zero as indicated by oscilloscope 20 and as illustrated schematically in FIG. 3*b*.

(c) The preferred axis of magnetization of film 24, as a direction in the plane of substrate 34 and parallel to word line 14, is then evident.

*Determination of figure of merit*

With the preferred axis of magnetization of film 24 determined as above and with inverter relay 16 ON, the following test can now be performed on film 24 to yield a quantitative figure of merit which, in turn, is an indication of the degree of magnetostriction inherent in the film:

(a) With film 24 initially oriented centrally with an aperture 32 as illustrated in FIGS. 2*a* and 2*b* rotate the preferred axis of magnetization of film 24 to an angle of 30° as may be determined by a compass rose or protractor from the direction of word line 14 (as illustrated in FIG. 4*a*) and read the peak-to-peak amplitude of oscilloscope 20 display (will be similar to FIG. 4*c*).

(b) Rotate the preferred axis of magnetization of film 24 back to its initial parallel relationship with word line 14 as indicated by oscillator 20 as illustrated in FIG. 3*c*.

(c) Deform substrate 34 a standard amount by applying pressure on each of the said pressure points **36*a*, 36*b*, 36*c*, and 36*d*** in the four quadrants as illustrated in FIG. 2*a*. This standard amount of deformation of substrate 34, and consequently film 24, is determined by the dimensions of aperture 32; sufficient pressure is applied to cause film 24 to just come into contact with the restraining surface of the bottom of aperture 32—in the embodiment of FIGS. 2*a* and 2*b* the thickness of ground plane 30 permits a maximum excursion of film 24 of approximately 2.7 mils. A signal whose amplitude is proportional to the magnetostriction in film 24 will be induced in sense line 22 and displayed on oscilloscope 20 as illustrated in FIG. 4*c*. Record the peak-to-peak amplitudes of the left hand pulses for the oscilloscope 20 displays corresponding to the four quadrant readings.

(d) Add the four readings of (c) above and divide this sum by twice the reading obtained in (a) above. The magnetostriction figure of merit is related to this figure. The factor of two in the divisor is arbitrary, and was chosen to make the quotient Q such that $$-1.0 \leqq Q \leqq +1.0$$

for most film cores.

It has been determined empirically that a particular word-organized memory of a plurality of films 24 requires a magnetostrictive figure of merit in the range of −0.5 (nickel-rich) to +0.5 (iron-rich), with 0.0 being an ideal magnetostrictive figure of merit. Consequently, by determining the magnetostrictive figure of merit of a film there is provided a means of determining the acceptability of a particular film.

*Determination of material composition*

An additional feature of this invention is that an indication is obtained as to whether the composition of the magnetostrictive film is iron-rich or nickel-rich. This can be determined while performing the test Determination of Figure of Merit. FIG. 2 illustrates the four quadrants comprising the area about the film 24. The portions of the film located in the quadrants I and III are geometrically and mechanically similar, hence the outputs will be similar when the film is deformed by pressure at points **36*a* and 36*c*; the portions of film 24** located in the quadrants II and IV are geometrically and magnetically similar, hence their outputs will be similar. As a standard deformation is achieved successively in each quadrant an output is generated as previously discussed in *c* above of the figure of merit test. The outputs due to the deformation in quadrants I and III or quadrants II and IV as displayed on scope 20, are then compared with FIGS. 5*a* and 5*b*. If the signals displayed on scope 20 are similar to FIG. 5*a* the film is said to be iron-rich; if the signals displayed on scope 20 are similar to FIG. 5*b* the film is said to be nickel-rich. The appropriate polarity sign is then given to the figure of merit: negative for nickel-rich; positive for iron-rich. The unsymmetrical relationship of the duration of the two states of the inverter relay 16 causes one trace on the scope to be brighter than the other trace; it is observed that an iron-rich composition of the film core under test will cause the brighter trace to be down in the left-hand pulses displayed on oscilloscope 20 when quadrants I and II are deformed, and conversely a nickel-rich composition will cause the brighter trace to be up when quadrants I and III are deformed. Consequently, by determining whether the brighter leading pulse of the trace on oscilloscope 20 is up or down, there is provided a means of determining the relative composition of the material of a particular film 24.

An additional method of determination of the film's material composition is available in the observation that when quadrants I or III are deformed, the crossover of the two traces displayed on oscilloscope 20 is immediately prior to the second pulse for an iron-rich film and is immediately subsequent to the first pulse for a nickel-rich film. The converse relations are observed when quadrants II or IV are deformed. See FIGS. 5*a* and 5*b*. This results from uncancelled noise in the circuit, which makes it possible to distinguish the state of the inverter relay 16 without any deliberate electronic "marking."

With a change of the particular pulse polarities, word line 14, or sense line 22 relationships involved in the particular test set-up disclosed herein the particular oscilloscope 20 display polarities and trace relationships may be interchanged. However, it is intended that although the above description be that of the preferred embodiment illustrated in FIG. 1–5*b*, no limitation to the particular embodiment is to be implied. Many modifications of the illustrated embodiment may become apparent to one skilled in the art once having acquired the teaching of the above discussion. As an example, it will be appreciated that the difference in duration of two series of different polarity pulses permits the recognition of the readout of the film generated by a particular polarity of pulse. This could be accomplished by a plurality of means, one of which would consist of preceding each readout of a particular polarity of pulse by a marking pulse.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A nondestructive method for determining the magnetostrictive magnetic characteristics and the relative preponderance of the constituent materials composition of a thin ferromagnetic film having rectangular hysteresis characteristics and a preferred axis of magnetization, comprising the steps of:

(a) Centering the film over the intersection of an orthogonally arranged set of word and sense lines and applying to said film a drive field made orthogonal to the said preferred axis of magnetization by physical rotation of the film core under test, which field is comprised of alternating series of, first, one polarity pulses and second, of the opposite polarity pulses, (b) applying the field to said film at an acute angle to the said preferred axis of magnetization, and observing the film's output on a signal tracing device, (c) repeating (a) above, (d) subjecting the film to a standard deformation and observing the film's output on a signal tracing device, (e) determining the material composition of the film by comparing the observations of (d) to a predetermined set of standards which standards relate the observations of (d) to an iron-rich or nickel-rich material composition, (f) determining the magnetic characteristics of the film by determining from the result of the observations of (b) and (d) a magnetostrictive figure of merit and comparing the determined magnetostrictive figure of merit to a predetermined acceptable range of the figure of merit.

2. A nondestructive method for determining the preferred axis of magnetization of a thin ferromagnetic film having rectangular hysteresis characteristics, comprising the steps of:

(a) centering the film over the intersection of an orthogonally arranged set of word and sense lines, (b) applying a pulsed D.C. drive signal to the said word line, (c) coupling the said sense line output to an oscilloscope, (d) rotating the film until the peak-to-peak amplitude of the film output displayed on the oscilloscope is a minimum, and (e) identifying the preferred axis of magnetization as a line through the geometric center of the film and parallel to the said word line when the film is oriented as determined in step (d).

3. A nondestructive method for determining the preferred axis of magnetization of a thin ferromagnetic film having rectangular hysteresis characteristics comprising the steps of:

(a) subjecting the film to a pulsed D.C. magnetic field of a known physical and magnetic relationship with the plane of said film, (b) rotating the film in a plane parallel to the plane defined by the physical and magnetic axes of said varying magnetic field, (c) determining from step (b) the orientation of the film with respect to the magnetic axis of said varying magnetic field when the output from said film is at a minimum, (d) identifying the preferred axis of magnetization as a line through the center of the film and parallel to the said pulsed D.C. magnetic field's magnetic axis when oriented as determined in step (c).

4. A nondestructive method for determining the preferred axis of magnetization of a thin ferromagnetic film having rectangular hysteresis characteristics, comprising the steps of:

(a) centering the film over the intersection of an orthogonally arranged set of word and sense lines, (b) applying a fluctuating D.C. drive signal to the said word line, (c) coupling said sense lines output to a signal amplitude indicating device, (d) rotating the film until the amplitude of the film output as indicated by the said signal amplitude indicating device is a minimum, (e) identifying the preferred axis of magnetization and a line through the geometric center of the film and parallel to the said word line when oriented when determined in step (d).

5. A nondestructive method for determining the preferred axis of magnetization of a thin ferromagnetic film having rectangular hysteresis characteristics, comprising the steps of:

(a) subjecting the film to a unidirectional varying magnetic field of a known physical and magnetic relationship with the plane of said film, (b) rotating the film in a plane parallel to the plane defined by the physical and magnetic axes of said varying magnetic field, (c) determining from step (b) the orientation of the film with respect to the magnetic axis of said varying magnetic field when the output from the said film is at a minimum, (d) identifying the preferred axis of magnetization as a line through the center of the film and parallel to the varying magnetic field's magnetic axis when oriented as determined in step (c).

6. A nondestructive method for determining the acceptability of the magnetostrictive magnetic characteristics of a thin ferromagnetic film having rectangular hysteresis characteristics and a preferred axis of magnetization by determining the film's magnetostrictive figure of merit and comparing the determined magnetostrictive figure of merit to a previously determined acceptable range of the magnetostrictive figure of merit, comprising the steps of:

(a) determining the film's preferred axis of magnetization, (b) centering the film over the intersection of an orthogonally arranged set of word and sense lines, (c) applying a pulsed D.C. drive signal to the said word line, (d) coupling the said sense line output to an oscilloscope, (e) orienting the film's preferred axis of magnetization at an angle of approximately 30° with respect to the physical axis of said word line, (f) reading the peak-to-peak amplitude of the 30° output as displayed on the said oscilloscope, (g) orienting the film's preferred axis of magnetism parallel to the said word line, (h) subjecting the film to a standard deformation once in each of the four quadrants as defined by the said word and sense lines, (i) reading and recording the peak-to-peak amplitude of the film output for each of the four tests as displayed on the said oscilloscope, (j) summing four readings of step (i), (k) obtaining the film's magnetostrictive figure of merit by dividing the sum of the step (j) by twice the reading of step (f), (l) determining the acceptability of the magnetic characteristics of the film by comparing the figure of merit obtained in step (k) to a predetermined acceptable range of the figure of merit.

7. A nondestructive method for determining the acceptability of the megnetostrictive magnetic characteristics of a thin ferromagnetic film having rectangular hysteresis characteristics and a preferred axis of magnetization by determining the film's magnetostrictive figure of merit and by comparing the determined magnetostrictive figure of merit to a previously determined acceptable range of the magnetostrictive figure of merit comprising the steps of:

(a) determining the film's preferred axis of magnetization, (b) centering the film over the intersection of an orthogonally arranged set of word and sense lines, (c) applying a pulsed drive signal to the said word line, (d) coupling the said sense line output to a signal amplitude indicating device, (c) orienting the film's preferred axis of magnetization at an acute angle with respect to the said word line, (f) recording the amplitude of the film output as indicated by said amplitude indicating device, (g) orienting the film's preferred axis of magnetization parallel to the said word line,
(h) subjecting the film to a standard deformation once in each of the four quadrants as defined by the said word and sense lines,
(i) recording the amplitude of the film output for each of the four tests of (h) as indicated by said amplitude indicating device,
(j) summing the four readings of step (i),
(k) obtaining the film's magnetostrictive figure of merit by dividing the sum of step (j) by the reading of step (f),
(l) determining the acceptablity of the magnetic characteristics of the films by comparing the figure of merit obtained in step (k) to a predetermined acceptable range of the figure of merit.

8. A nondestructive method for determining the material composition of a thin ferromagnetic film having rectangular hysteresis characteristics and a preferred axis of magnetization, comprising the steps of:
(a) applying a field transverse to the said preferred axis of magnetization which field is comprised of alternating series of, first, one polarity pulses, and, second, of the opposite polarity pulses,
(b) subjecting the film to a standard deformation and observing the film output displayed on an oscilloscope,
(c) determining from the observations of (b) the material composition of the film by comparing the observations of (b) to a predetermined set of standards which standards relate the cross-over of the two traces of the film output as displayed on the oscilloscope, being immediately following the initial pulses or immediately prior to the second pulses, to an iron-rich or nickel-rich material composition.

9. A nondestructive method for determining the material composition of a thin ferromagnetic film having rectangular hysteresis characteristics and a preferred axis of magnetization, comprising the steps of:
(a) applying a signal transverse to the said preferred axis of magnetization which signal is comprised of alternating series of, first, one polarity pulses and then, second, of opposite polarity pulses for a shorter time duration,
(b) subjecting the film to a standard deformation and observing the film output as displayed on the oscilloscope,
(c) determining on the observations of (b) the material composition of the film by comparing the observations of (b) to a predetermined set of standards which standards relate the polarity of the initial pulse of brighter trace, due to the longer duration of the series of first polarity pulses, to an iron-rich or nickel-rich material composition.

10. A nondestructive method for determining the material composition of a thin ferromagnetic film having rectangular hysteresis characteristics and a preferred axis of magnetization, comprising the steps of:
(a) determining the film's preferred axis of magnetization,
(b) centering the film over the intersection of an orthogonally arranged set of word and sense lines,
(c) applying a signal to the said word line which signal consists of alternating series of first one polarity pulses and a second shorter duration series of opposite polarity pulses,
(d) coupling said sense line output to an oscilloscope,
(e) orienting the film's preferred axis of magnetization parallel to the said word line,
(f) subjecting the film to a standard deformation once in each of two adjoining quadrants as defined by the said word and sense lines,
(g) observing the film's output as displayed on the oscilloscope for each of the two tests of (f),
(h) determining, for each of the observations of (g), if the initial pulse of the brighter trace, which is due to the longer duration of the series of the first polarity pulses of step (c) and as displayed on the oscilloscope, is up or down,
(i) determining, for each determination of (h), the material composition of the film by comparing the results of (h) to a predetermined set of standards which standards relate the polarity of the initial pulse on the brighter trace, which is due to the longer duration series of the first polarity pulses, to an iron-rich or nickel-rich material composition.

References Cited by the Examiner

UNITED STATES PATENTS

| | | | |
|---|---|---|---|
| 2,805,390 | 9/57 | Patrick et al. | 324—40 |
| 2,841,763 | 7/58 | Stuart-Williams et al. | 324—40 |
| 2,934,696 | 4/60 | Williams et al. | 324—40 X |

OTHER REFERENCES

Bozorth et al.: Magnetic Properties of Metals and Alloys, published by American Society for Metals, Cleveland, Ohio, 1959, pp. 118 to 121, and 331 to 336 principally relied on.

Mitchell et al.: Journal of Applied Physics, Supplement to vol. 33, No. 3, March 1962, pp. 1170 and 1171.

FREDERICK M. STRADER, *Primary Examiner.*

MAYNARD R. WILBUR, KATHLEEN H. CLAFFY, CHESTER L. JUSTUS, *Examiners.*